United States Patent [19]

Hirai et al.

[11] Patent Number: 4,891,393
[45] Date of Patent: Jan. 2, 1990

[54] THERMOSETTING ORGANOPOLYSILOXANE COMPOSITION

[75] Inventors: Kazuo Hirai, Ichihara; Takao Matsushita, Kisarazu, both of Japan

[73] Assignee: Toray Silicone Company, Ltd., Tokyo, Japan

[21] Appl. No.: 225,324

[22] Filed: Jul. 28, 1988

[30] Foreign Application Priority Data

Jul. 30, 1987 [JP]  Japan .................................. 62-191446

[51] Int. Cl.$^4$ ............................................. C08K 9/06
[52] U.S. Cl. ..................................... 523/212; 523/216; 525/478; 428/450
[58] Field of Search ................. 525/478; 523/212, 216

[56] References Cited

U.S. PATENT DOCUMENTS

| | | | |
|---|---|---|---|
| Re. 31,843 | 3/1985 | Noble et al. | 523/212 |
| 4,108,825 | 8/1978 | Hayes | 523/212 |
| 4,344,800 | 8/1982 | Lutz | 106/308 |
| 4,418,165 | 11/1983 | Chapman et al. | 523/210 |
| 4,454,288 | 6/1984 | Lee et al. | 524/588 |
| 4,560,711 | 12/1985 | Suzuki | 523/212 |

*Primary Examiner*—Melvyn I. Marquis
*Assistant Examiner*—Karen A. Hellender
*Attorney, Agent, or Firm*—Roger H. Borrousch

[57] ABSTRACT

A thermosetting organopolysiloxane composition made from organopolysiloxane gum, reinforcing silica having at least two weight percent methoxy groups, organohydrogenpolysiloxane having at least three silicon-bonded hydrogen atoms per molecule, and a curing catalyst, such as organic peroxide or platinum catalyst, exhibit improved adhesion to a variety of substrates such as glasses, metals, and plastics.

5 Claims, No Drawings

THERMOSETTING ORGANOPOLYSILOXANE COMPOSITION

BACKGROUND OF THE INVENTION

1. Technical Field

The present invention relates to a thermosetting organopolysiloxane composition which has good adhesive properties, and in particular further relates to a thermosetting organopolysiloxane composition which strongly bonds to various types of materials upon its thermal cure.

2. Prior Art

Thermosetting organopolysiloxane compositions are in fact known in the form of so-called silicone rubbers and silicone varnishes, but unfortunately in general they adhere poorly to other materials.

In applications involving bonding silicone rubber to other materials, the general technique has heretofore been to treat the surface of the other material with a primer. However, the generation of a bond by the application of a thermosetting organopolysiloxane composition after a primer treatment is economically disadvantageous due to the required two-step operation. The problem also arises of the risk of nonuniform bonding deriving from a nonuniform coating of primer. In addition, the generation of adhesion has been attempted through the addition to thermosetting organopolysiloxane compositions of particular types of components. However, this approach has not been suitable to practical applications because, inter alia, there are limitations on the materials which can be bonded and the adhesive strength and durability of adhesion are unsatisfactory even when a bond is obtained.

SUMMARY OF THE INVENTION

Problems to Be Solved by the Invention

The present inventors, as a result of investigations directed at solving the above problems, found that an excellent mechanical strength as well as strong bonding to various types of materials were to be had from the composition obtained by the joint addition to a thermosetting organopolysiloxane composition of a specific reinforcing silica and an organohydrogenpolysiloxane containing at least 3 silicon-bonded hydrogen atoms in each molecule. The present invention was achieved based on this finding.

That is, the object of the present invention is to provide a thermosetting organopolysiloxane composition, which is distinguished by its ability to convert into a silicone rubber, which bonds well to various types of materials, such as glasses, metals, plastics, etc., and which also has an excellent mechanical strength.

Structure and Function of the Invention

The present invention relates to a thermosetting organopolysiloxane composition comprising (A) 100 parts by weight of organopolysiloxane gum having the following average unit formula

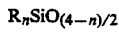

$R_nSiO_{(4-n)/2}$ in the formula, R is a substituted or unsubstituted monovalent hydrocarbon group, and n=1.9 to 2.1, (B) 5 to 100 weight parts reinforcing silica which has a specific surface area of at least 200 m²/g, which contains at least 2.0 weight percent methoxy groups, and which consists of the SiO₂ unit and organosiloxane units selected from the group comprising the $R_3SiO_{\frac{1}{2}}$ unit, $R_2SiO$ unit, $RSiO_{3/2}$ unit, and their mixtures, where R is defined as above, with the proviso that the molar ratio of organosiloxane units/SiO₂ unit is from 0.08:1 to 2.0:1, (C) 1 to 10 parts by weight organohydrogenpolysiloxane having at least 3 silicon-bonded hydrogen atoms in each molecule, and (D) a curing catalyst in a quantity sufficient to cure the instant composition.

DETAILED DESCRIPTION OF THE PREFERRED EMBODIMENTS

To explain this in detail, R in the above formula for the organopolysiloxane gum comprising component (A) used in the present invention comprises substituted and unsubstituted monovalent hydrocarbon groups, and is exemplified by alkyl groups such as methyl, ethyl, propyl, etc.; alkenyl groups such as vinyl, allyl, etc.; cycloalkyl groups such as cyclohexyl, etc.; aralkyl groups such as beta-phenylethyl, etc.; aryl groups such as phenyl, etc.; and halogenated alkyl groups such as chloromethyl, 3-chloropropyl, 3,3,3-trichloropropyl, etc. While n in the above formula is specified at 1.9 to 2.1, substances in which n=2, that is, a diorganopolysiloxane gum, are preferred. The molecular weight of the diorganopolysiloxane gum is not specifically restricted, and useable molecular weights will fall within the range associated with organopolysiloxane gums in this art. In general, viscosities of at least $10^7$ centistokes at 25 degrees Centigrade and average molecular weights of at least $25 \times 10^4$ and preferably at least $40 \times 10^4$ will be used. Furthermore, while the organic groups in the organopolysiloxane comprising component (A) are not specifically restricted to within the range for R given above, it will be necessary that component (A) be a diorganopolysiloxane having at least two alkenyl groups in each molecule in the specific case in which the curing catalyst comprising component (D) consists of only a platinum-type compound without the use of organoperoxide.

The reinforcing silica comprising the component (B) of the present invention is the essential component which characterizes the present invention. While it functions to improve the mechanical strength of the silicone rubber obtained by the thermal curing of the composition of the present invention, at the same time, through its joint use with component (C), it functions to promote the bonding performance of the composition of the present invention and to equip the thermally cured silicone rubber with adhesiveness, and particularly with a durable adhesion, for various types of materials. Component (B) is a reinforcing silica which consists of SiO₂ units and organosiloxane units selected from the group comprising the $R_3SiO_{\frac{1}{2}}$ unit, $R_2SiO$ unit, $RSiO_{3/2}$ unit, and their mixtures. Generally speaking, said organosiloxane units are to be present in a quantity sufficient to render the reinforcing silica filler hydrophobic, and the molar ratio of organosiloxane units/SiO₂ unit will be from 0.08:1 to 2.0:1 and preferably from 0.08:1 to 0.5:1. The adhesiveness drops off when this molar ratio falls below 0.08:1. On the other hand, when the molar ratio of 2.0:1 is exceeded, the decline in reinforcement is so substantial that the main function as a reinforcing silica can longer be fulfilled. In addition, component (B) must contain at least 2 weight percent (wt %) and preferably contains 3 wt % to 30 wt % methoxy groups, CH3O groups: at less than 2 wt %, one encounters a substantial reduction in adhesion by the present invention's composition for various types of materials. Furthermore, this component should have a specific surface area of at least 200 m²/g and preferably has a specific surface area of at least 300 m²/g in order to obtain an increased mechanical strength for the silicone rubber product.

The addition of component (B) will fall within the range of 5 to 100 parts by weight and preferably within the range of 10 to 30 parts by weight, in each case based on 100 parts by weight of component (A).

This component (B) can be obtained according to methods disclosed in, for example, U.S. Pat. No. 4,344,800, issued Aug. 17, 1982 to Lutz; U.S. Pat. No. 4,418,165, issued Nov. 29, 1983, to Polmanteer et al; and U.S. Pat. No. 4,454,288, issued Jun. 12, 1984, to Lee et al which patents are hereby incorporated by reference to show methods of preparing silicas and the silicas prepared thereby.

The organohydrogenpolysiloxane comprising the component (C) used in the present invention, through its joint use with the above component (B), promotes the adhesiveness of the composition of the present invention and functions to equip the thermally cured silicone rubber with adhesiveness, and particularly with a durable adhesion, for various types of materials.

With regard to this component (C), its content of at least 3 silicon-bonded hydrogen atoms in each molecule is essential from the standpoint of adhesiveness. These hydrogen atoms may be bonded at the molecular chain terminals, or may be pendant on the chain, or may be present at both positions. The silicon-bonded organic groups comprise monovalent hydrocarbon groups, for example, alkyl groups such as methyl, ethyl, propyl, and octyl; aryl groups such as phenyl; and substituted alkyl groups such as 3,3,3-trifluoropropyl; however, aliphatically unsaturated hydrocarbon groups must not be present. The molecular weight of this component is not specifically restricted, and in general, can be used in the range where the viscosity at 25 degrees Centigrade is from 1 to 1,000 centistokes and preferably 1 to 100 centistokes. Examples of component (C) are trimethylsiloxy-terminated dimethylsiloxanemethylhydrogensiloxane copolymers, dimethylhydrogensiloxyterminated dimethylpolysiloxanes, and organopolysiloxanes consisting of $H(CH_3)_2SiO_{\frac{1}{2}}$ units and $SiO_2$ units. Component (C) is to be added within the range of 1 to 10 parts by weight for each 100 weight parts component (A).

The curing agent comprising component (D) used in the present invention is a catalyst for curing the composition of the present invention, and organoperoxides are generally used in this regard. While it is possible to use a platinum-type compound or to use an organoperoxide and platinum-type compound in combination, the use of only a platinum-type compound necessitates the exercise of some caution due to the restriction on the organic groups in the organopolysiloxane comprising component (A) as above. The organoperoxide is exemplified by dicumyl peroxide, di-t-butyl peroxide, t-butyl cumyl peroxide, 2,5-dimethyl-2,5-di(t-butylperoxy)hexane, 2,5-dimethyl-2,5-di(t-butylperoxy)hexyne, 1,1-bis(t-butylperoxy)-3,3,5-trimethylcyclohexane, benzoyl peroxide, and 2,4-dichlorobenzoyl peroxide. The platinum-type compounds are exemplified by chloroplatinic acid, alcohol-modified chloroplatinic acid, platinum chelates, chloroplatinic acid-olefin coordination compounds, and microparticulate platinum adsorbed on a particulate carbon support. Component (D) is to be present in a quantity sufficient for the curing of the present invention's composition: for organoperoxides this falls within the range of 0.1 to 10 parts by weight; for platinum-type compounds this falls within the range of 0.1 to 300 parts by weight for each one million parts by weight of the total quantity of components (A) through (C).

In order even further to improve the properties, and particularly the adhesiveness, of the present invention's thermosetting organopolysiloxane composition, it is advantageous to add to components (A) through (D) an alkoxysilane having at least one alkenyl group and one silicon-bonded alkoxy group in each molecule, or the partial hydrolysis condensate of such a silane. The instant component is concretely exemplified by gamma-methacryloxypropyltrimethoxysilane, gamma-acryloxypropyltrimethoxysilane, vinyltrimethoxysilane, vinyltri(methoxyethoxy)silane, and allyltrimethoxysilane. This component is preferably added within the range of 0.1 to 5 parts by weight for each 100 weight parts of component (A).

In order even further to improve the properties, and particularly the adhesiveness, of the present invention's thermosetting organopolysiloxane composition, it is advantageous to add to components (A) through (D) an organopolysiloxane having a degree of polymerization of 2 through 50 and having in each molecule at least 1 epoxy group, at least 1 alkenyl group, and at least 1 methoxy group. The instant component is exemplified by the organopolysiloxane obtained by the condensation reaction (alcohol-liberating) between gamma-glycidoxypropyltrimethoxysilane and a hydroxyl group-terminated methylvinylsiloxane-dimethylsiloxane copolymer. This component is preferably added at 0.1 to 5 parts by weight for each 100 weight parts of component (A).

The composition of the present invention can be prepared by kneading the specified quantities of the above components (A) through (D) in, for example, a two-roll, kneader, Banbury mixer, etc. With the proviso that the object of the present invention is not adversely impacted, the various additives known in the art can also be added here, for example, heat stabilizers such as titanium oxide, iron oxide red, cerium oxide, barium zirconate; flame retardants such as halogen compounds and antimony oxide; and physical property-improvers such as silanes or polysiloxanes, etc.

The composition of the present invention as described above, because it affords a silicone rubber having an excellent mechanical strength as well as excellent adhesion to various types of materials in contact with it, can be used as a coating and as an adhesive for joining various types of materials together.

EXAMPLES

The present invention is explained in the following illustrative examples and reference examples. In the illustrative examples, parts=parts by weight, and the viscosity was measured at 25 degrees Centigrade. In the reference examples and illustrative examples, the following methods were used to obtain the surface area and methoxy group content of the reinforcing silica and to carry out adhesion testing.

METHOD FOR MEASURING THE SURFACE AREA OF THE REINFORCING SILICA

This was measured according to the well-known BET method (continuous flow nitrogen adsorption)

using a Model 2200 specific surface area automatic measurement device from Shimadzu Seisakusho Limited.

METHOXY GROUP CONTENT IN THE REINFORCING SILICA

The synthesized reinforcing silica and acetic anhydride were reacted in 1,2-dichloroethane in the presence of a perchloric acid catalyst (acetylation reaction). After subsequent hydrolysis of the unreacted reagent using a mixture of dimethylformamide/pyridine/water (weight ratio=6/3/1), the determination was carried out by quantitating the amount of reacted acetic anhydride using a potassium hydroxide solution, and the methoxy group content was calculated as a percentage.

ADHESION TESTING

According to JIS K-6301, a test specimen was prepared by bonding the silicone rubber on a 25.4 mm wide test panel. The silicone rubber edge of this test specimen was then subjected to a 90 degree tensile peel, and the ahesive strength was calculated from the tensile strength at this time.

REFERENCE EXAMPLE 1.

Preparation of Hydrophobe Agents

Preparation was carried out according to the method disclosed in U.S. Pat. No. 4,454,288.

A ring-opened and randomly distributed organopolysiloxane was prepared by reacting the following at 105 degrees Centigrade for approximately 2 hours: 277 g octamethylcyclotetrasiloxane, 4.6 g 1,3,5,7-tetramethyl-1,3,5,7-tetravinylcyclotetrasiloxane, 517 g methyltrimethoxysilane, and 0.43 g potassium hydroxide as catalyst. After neutralization of the potassium hydroxide with carbon dioxide, analysis of the obtained organopolysiloxane confirmed it to be a linear organopolysiloxane containing 0.7 mole % methylvinylsiloxy groups (hydrophobe agent A).

282 g octamethylcyclotetrasiloxane, 517 g methyltrimethoxysilane, and 0.4 g potassium hydroxide were also reacted as above to afford a linear organopolysiloxane which did not contain vinyl groups (hydrophobe agent B).

REFERENCE EXAMPLE 2.

Synthesis of Reinforcing Silicas 118 g methanol, 32 g concentrated aqueous ammonia, and 39 g hydrophobe agent A were placed in a glass reactor and mixed to homogeneity using a magnetic stirrer. Then, while vigorously stirring this mixture, 96 g methyl orthosilicate was added in one portion The reaction product gelled after 15 seconds and stirring was suspended, and it was then taken directly and aged by standing under seal for one week (solvent dispersion of reinforcing silica A).

After pulverization of the obtained gel, it was placed in an evaporator, and a reinforcing silica (reinforcing silica A) was obtained by removing the methanol and ammonia gas present in the gel at 90 degrees Centigrade under reduced pressure. The results of the determination of its BET surface area and methoxy group content are reported in Table 1. A reinforcing silica B was prepared as above, but using hydrophobe agent B in place of hydrophobe agent A, and its properties are also reported in Table 1.

TABLE 1

| SPECIES OF REINFORCING SILICA | BET SURFACE AREA (m²/g) | METHOXY GROUP CONTENT IN wt % |
|---|---|---|
| Reinforcing silica A | 470 | 9.9 |
| Reinforcing silica B | 400 | 10.2 |

REFERENCE EXAMPLE 3

255 g methanol, 21 g water, 53.4 g concentrated aqueous ammonia, and 36.4 g hexamethyldisilazane were placed in a glass reactor and mixed to homogeneity using a magnetic stirrer. Then, while vigorously stirring this mixture, 96 g methyl orthosilicate was added in one portion. The reaction product gelled after approximately 50 to 60 seconds. The glass reactor was then sealed and allowed to stand as such for 1 week in order to obtain a gelled reaction product. This gelled reaction product was worked up as in Example 1, and the properties of the obtained reinforcing silica (reinforcing silica C) were measured and are reported in Table 2. In addition, 264 g methanol, 3.14 g water, 66 g concentrated aqueous ammonia, and 25 g hexamethylcyclotrisiloxane were placed in a reactor as above, and a gelled reaction product was obtained by the addition and reaction as above of 96 g methyl orthosilicate. This gelled reaction product was worked up as above, and the properties of the obtained reinforcing silica (reinforcing silica D) were measured and are reported in Table 2.

TABLE 2

| SPECIES OF REINFORCING SILICA | BET SURFACE AREA (m²/g) | METHOXY GROUP CONTENT IN wt % |
|---|---|---|
| Reinforcing silica C | 350 | 2.2 |
| Reinforcing silica D | 420 | 0.3 |

EXAMPLE 1

100 Parts dimethylvinylsiloxy-terminated methylphenylpolysiloxane gum (degree of polymerization=approximately 4,000) composed of 92.4 mole % dimethylsiloxane units, 7.5 mole % methylphenylsiloxane units, and 0.14 mole % methylvinylsiloxane units, and 240 parts of the solvent dispersion of reinforcing silica A (reinforcing silica content=25 wt %) prepared in Reference Example 2 were placed in a kneader mixer and mixed while removing the solvent with heating at 120 degrees Centigrade. The volatile components were then completely removed by additional mixing for 2 hours at 180 degrees Centigrade under reduced pressure, thus to afford a silicone rubber base (silicone rubber base A). A silicone rubber composition (silicone rubber composition A1) was then prepared by mixing 0.4 parts 2,5-bis(t-butylperoxy)-2,5-dimethylhexane as the vulcanizing agent and 1.0 part trimethylsiloxy-terminated methylhydrogenpolysiloxane (viscosity=25 centistokes, SiH content=1.5 wt %) into each 100 parts of this silicone rubber base A. Silicone rubber bases B and C were prepared as above, but respectively using reinforcing silica B or C in place of reinforcing silica A, and silicone rubber compositions B1 and C1 were then also prepared as above.

Each silicone rubber composition was applied to the surfaces of iron, stainless steel, brass, and aluminum plates (25.4×60.3×2.54 mm). Vulcanization was carried out for 10 minutes at 170 degrees Centigrade/25 kg/cm² in a metal mold designed so that the post-vulcanization thickness of the silicone rubber would be 5.4 mm. The products were test specimens in which the silicone rubber and test plate had been bonded into a single unit. The obtained test specimens were then subjected to adhesion testing, and the results are reported in Table 3. Table 4 reports the results of measurements of the physical properties of the silicone rubbers according to JIS K-6301.

Silicone rubber compositions A1 through C1 were also respectively adhered on glass plates (5.0×50×50 mm) as above, and test specimens were prepared in which the silicone rubber and test plate were bonded into a single piece. The silicone rubber edge of the test specimen was then subjected to a manual 90 degree tensile pull: in all cases, the fracture surface presented fracture in the silicone rubber. For comparison, a silicone rubber composition D1 was prepared as above using reinforcing silica D in place of reinforcing silica A, and it was subjected, again as above, to adhesion testing and measurement of the physical properties of the silicone rubber. These results are also reported in Tables 3 and 4.

TABLE 3

RESULTS OF ADHESION TESTING

| SILICONE RUBBER COMPOSITION | ADHESIVE STRENGTH IN kg/cm | | | |
|---|---|---|---|---|
| | IRON | STAINLESS STEEL | BRASS | ALUMINUM |
| A1 | 4.2 | 4.8 | 2.1 | 1.1 |
| B1 | 4.3 | 4.5 | 2.3 | 1.2 |
| C1 | 3.2 | 3.5 | 1.5 | ≦0.5 |
| D1 (comparison) | 2.1 | 2.3 | ≦0.5 | ≦0.5 |

TABLE 4

PHYSICAL PROPERTIES OF THE SILICONE RUBBERS

| SILICONE RUBBER COMPOSITION | HARDNESS | TENSILE STRENGTH (kg/cm²) | ELONGATION (%) | TEAR STRENGTH (kg/cm) | APPEARANCE |
|---|---|---|---|---|---|
| A1 | 60 | 90 | 600 | 39 | transparent |
| B1 | 53 | 95 | 700 | 35 | transparent |
| C1 | 50 | 102 | 590 | 32 | transparent |
| D1 (comparison) | 56 | 92 | 670 | 30 | transparent |

EXAMPLE 2

Silicone rubber compositions A2 through D2 were obtained by operating as in Example 1, with the exception that a dimethylvinylsiloxy-terminated dimethylsiloxanemethylvinylsiloxane copolymer (99.84 mole % dimethylsiloxane units, 0.16 mole % methylvinylsiloxane units) was used in place of the methylphenylsiloxane gum used in Example 1. Again as in Example 1, these compositions were subjected to adhesion testing against the various types of materials and measurement of the physical properties of the silicone rubbers obtained by vulcanization, and these results are reported in Tables 5 and 6.

TABLE 5

RESULTS OF ADHESION TESTING

| SILICONE RUBBER COMPOSITION | ADHESIVE STRENGTH IN kg/cm | | | |
|---|---|---|---|---|
| | IRON | STAINLESS STEEL | BRASS | ALUMINUM |
| A2 | 3.8 | 4.0 | 1.8 | ≦0.5 |
| B2 | 3.9 | 3.7 | 1.5 | ≦0.5 |
| D2 (comparison) | 2.0 | 2.1 | 0 (exfoliated) | 0 (exfoliated) |

TABLE 6

PHYSICAL PROPERTIES OF THE SILICONE RUBBERS

| SILICONE RUBBER COMPOSITION | HARDNESS | TENSILE STRENGTH (kg/cm²) | ELONGATION (%) | TEAR STRENGTH (kg/cm) |
|---|---|---|---|---|
| A2 | 59 | 102 | 650 | 40 |
| B2 | 50 | 98 | 750 | 36 |
| D2 (comparison) | 55 | 99 | 720 | 30 |

EXAMPLES 3 and 4

1.0 Part vinyltrimethoxysilane was blended into silicone rubber composition A1 obtained as in Example 1, and Table 7 reports, as Example 3, the results of measurement of the adhesive strength as in Example 1 for the resulting composition against various materials. Table 7 also reports, as Example 4, the results of measurement of the adhesive strength as in Example 1 against various materials for a silicone rubber composition obtained as above using 1.0 part gamma-methacryloxypropyltrimethoxysilane in place of the above vinyltrimethoxysilane.

TABLE 7

| MATERIAL | EXAMPLE 3 ADHESIVE STRENGTH (kg/cm) | EXAMPLE 4 ADHESIVE STRENGTH (kg/cm) |
|---|---|---|
| Iron | 6.8 | 8.0 |
| Stainless steel | 6.5 | 7.0 |
| Brass | 3.9 | 3.5 |
| Aluminum | 2.0 | 2.2 |
| Polyester resin | 3.6 | 3.5 |
| Melamine resin | 4.2 | 4.8 |
| PBT resin | 1.0 | 1.2 |

EXAMPLE 5

1.0 Part epoxy group-containing organopolysiloxane having formula (1) was blended into silicone rubber composition A1 obtained as in Example 1. The adhesive strength for various types of materials was measured as in Example 1 using this silicone rubber composition, and these results are reported in Table 8.

TABLE 8

| MATERIAL | ADHESIVE STRENGTH (kg/cm) |
| --- | --- |
| Iron | 6.0 |
| Stainless steel | 5.2 |
| Brass | 3.0 |
| Aluminum | 1.8 |
| Polyester resin | 3.5 |
| Melamine resin | 4.0 |
| Polybutylene terephthalate | 10 |

EXAMPLE 6

The following were blended into 100 parts silicone rubber base A obtained as in Example 1: 1.0 part trimethylsiloxy-terminated methylhydrogensiloxanedimethylsiloxane copolymer (viscosity=7 centistokes at 25 degrees Centigrade) composed of 15 moles methylhydrogensiloxane units and 3 moles dimethylsiloxane units, chloroplatinic acidmethylvinylsiloxane complex in a quantity sufficient to afford 10 ppm as platinum, and 1 ppm methyltris(methylisobutynoxy)-silane.

1.0 Part vinyltrimethoxysilane was blended into 100 weight parts of the obtained addition-curing silicone rubber composition. This composition was subjected to adhesion testing as in Example 1, and these results are reported in Table 9 as Example 6. In addition, 1.0 part of the epoxy group-containing organopolysiloxane used in Example 5 and 1.0 gamma-methacryloxypropyl-trimethoxysilane were each respectively blended into 100 weight parts of the above addition-curing silicone rubber composition. These compositions were subjected to adhesion testing as above, and the results are respectively reported as Example 7 and Example 8 in Table 9.

TABLE 9

| MATERIAL | EXAMPLE 6 ADHESIVE STRENGTH (kg/cm) | EXAMPLE 7 ADHESIVE STRENGTH (kg/cm) | EXAMPLE 8 ADHESIVE STRENGTH (kg/cm) |
| --- | --- | --- | --- |
| Iron | 5.1 | 5.6 | 4.5 |
| Stainless steel | 6.2 | 5.8 | 5.0 |
| Brass | 2.5 | 2.8 | 1.8 |
| Aluminum | 1.3 | 1.5 | ≦0.5 |
| Polyester resin | 3.0 | 3.5 | 3.8 |
| Melamine resin | 4.0 | 4.7 | 9 |

EFFECTS OF THE INVENTION

Because the thermosetting organopolysiloxane composition of the present invention prepared from components (A) through (D) comprises a thermosetting organopolysiloxane composition which contains in particular the organohydrogenpolysiloxane comprising component (C) and the specific reinforcing silica comprising component (B), it characteristically converts to a silicone rubber which bonds well to other materials, for example, glasses, metals, plastics, etc., and which also has an excellent mechanical strength. Accordingly, it is useful as an adhesive for bonding different types of materials into a single unit.

That which is claimed is:

1. A thermosetting organopolysiloxane composition comprising;
   (A) 100 parts by weight of organopolysiloxane gum having the following average unit formula $$R_nSiO_{(4-n)/2}$$

in the formula, R is a substituted or unsubstituted monovalent hydrocarbon group, and n=1.9 to 2.1,
   (B) 5 to 100 weight parts reinforcing silica which has a specific surface area of at least 200 m²/g, which contains at least 2.0 weight percent methoxy groups, and which consists of the $SiO_2$ unit and organosiloxane units selected from the group consisting of the $R_3SiO_{\frac{1}{2}}$ unit, $R_2SiO$ unit, $RSiO_{3/2}$ unit, and their mixtures, where R is defined as above, with the proviso that the molar ratio of organosiloxane units/$SiO_2$ unit is from 0.08:1 to 2.0:1,
   (C) 1 to 10 parts by weight organohydrogenpolysiloxane having at least 3 silicon-bonded hydrogen atoms in each molecule, and
   (D) a curing catalyst for curing the composition and in a quantity sufficient to cure the instant composition.

2. The thermosetting organopolysiloxane composition according to claim 1 further comprising an alkoxysilane having at least one alkenyl group and one silicon-bonded alkoxy group in each molecule or the partial hydrolysis condensate thereof.

3. The thermosetting organopolysiloxane composition according to claim 1 further comprising an organopolysiloxane having a degree of polymerization of 2 to 50 and having at least one epoxy group, at least one alkenyl group, and at least one silicon-bonded methoxy group in each molecule.

4. The thermosetting organopolysiloxane composition according to claim 1 as an adhesive.

5. The thermosetting organopolysiloxane composition according to claim 3 as an adhesive.

* * * * *